United States Patent
Ito et al.

(10) Patent No.: US 11,467,694 B2
(45) Date of Patent: Oct. 11, 2022

(54) SOURCE OUTPUT VOLTAGE COMPENSATION FOR DISPLAY NOISE

(71) Applicant: Synaptics Incorporated, San Jose, CA (US)

(72) Inventors: Daisuke Ito, Tokyo (JP); Jonathan Losh, Mountain View, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/243,192

(22) Filed: Apr. 28, 2021

(65) Prior Publication Data

US 2022/0187976 A1 Jun. 16, 2022

Related U.S. Application Data

(60) Provisional application No. 63/125,344, filed on Dec. 14, 2020.

(51) Int. Cl.

| | |
|---|---|
| *G06F 3/041* | (2006.01) |
| *G06F 3/044* | (2006.01) |
| *G09G 3/32* | (2016.01) |
| *G09G 3/3291* | (2016.01) |

(52) U.S. Cl.
CPC .......... *G06F 3/04184* (2019.05); *G06F 3/044* (2013.01); *G09G 3/3291* (2013.01); *G09G 2310/027* (2013.01); *G09G 2310/08* (2013.01); *G09G 2320/02* (2013.01); *G09G 2320/0673* (2013.01)

(58) Field of Classification Search
CPC .. G06F 3/0412; G06F 3/0418; G06F 3/04184; G06F 3/044; G09G 2310/08; G09G 3/3291; G09G 2310/027; G09G 2320/02; G09G 2320/0673
See application file for complete search history.

(56) References Cited

U.S. PATENT DOCUMENTS

| | | | |
|---|---|---|---|
| 2015/0160761 A1* | 6/2015 | Lee | G06F 3/0412 345/174 |
| 2018/0107315 A1* | 4/2018 | Lee | G06F 3/0412 |
| 2019/0179484 A1* | 6/2019 | Jang | G06F 3/04166 |
| 2019/0384475 A1* | 12/2019 | Kim | G09G 3/2092 |

* cited by examiner

*Primary Examiner* — Hong Zhou
(74) *Attorney, Agent, or Firm* — Ferguson Braswell Fraser Kubasta PC (57) ABSTRACT

An input-display device includes a display screen disposed on a display substrate, the display screen including a multitude of display pixels. The input-display device further includes a multitude of capacitive sensing electrodes for capacitive sensing in a sensing region of the display screen. The input-display device also includes a source driver circuit configured to generate a data voltage for driving a pixel circuit associated with one display pixel of the multitude of display pixels and determine a timing for a compensatory modulation of the data voltage. The timing is determined using a sensing waveform of the capacitive sensing. The source driver circuit is also configured to determine an amplitude of the compensatory modulation, generate a modulated data voltage by applying the compensatory modulation to the data voltage, and drive the pixel circuit using the modulated data voltage.

20 Claims, 6 Drawing Sheets

SOURCE OUTPUT VOLTAGE COMPENSATION FOR DISPLAY NOISE

CROSS REFERENCE TO RELATED APPLICATIONS

This application claims benefit under 35 U.S.C. § 119(e) to U.S. Provisional Patent Application Ser. No. 63/125,344, filed on Dec. 14, 2020. U.S. Provisional Patent Application Ser. No. 63/125,344 is incorporated herein by reference in its entirety.

TECHNICAL FIELD

The described embodiments relate generally to electronic devices, and more specifically, to the use of a shared memory for the operation of an input-display device.

BACKGROUND

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are often combined with display devices to operate as input-display devices (such as touch screens integrated in cellular phones).

In an input-display device, the proximity sensor device and the display device may be highly integrated. The high integration may result in parasitic capacitances between components of the proximity sensor device and components of the display device. As a result, a sensing waveform, emitted by the proximity sensor device, may capacitively couple onto signals of the display device, thereby causing display artifacts.

SUMMARY

In general, in one aspect, one or more embodiments relate to an input-display device, that includes a display screen disposed on a display substrate. The display screen includes display pixels, capacitive sensing electrodes for capacitive sensing in a sensing region of the display screen, and a source driver circuit. The source driver circuit is configured to generate a data voltage for driving a pixel circuit associated with one display pixel of the display pixels, determine a timing for a compensatory modulation of the data voltage, wherein the timing is determined using a sensing waveform of the capacitive sensing, determine an amplitude of the compensatory modulation, generate a modulated data voltage by applying the compensatory modulation to the data voltage and drive the pixel circuit using the modulated data voltage.

In general, in one aspect, one or more embodiments relate to a touch and display driver integration (TDDI) circuit. The TDDI circuit includes a source driver circuit configured to generate a data voltage for driving a pixel circuit associated with a pixel of a display screen, based on a processed image signal, determine a timing for a compensatory modulation of the data voltage, wherein the timing is determined using a sensing waveform of a capacitive sensing, determine an amplitude of the compensatory modulation, generate a modulated data voltage by applying the compensatory modulation to the data voltage, and drive the pixel circuit using the modulated data voltage.

In general, in one aspect, one or more embodiments relate to a method for driving a display of an input-display device. The method includes generating a data voltage for driving a pixel circuit of the display, determining a timing for a compensatory modulation of the data voltage, wherein the timing is determined using a sensing waveform of a capacitive sensing, determining an amplitude of the compensatory modulation, generating a modulated data voltage by applying the compensatory modulation to the data voltage, and driving the pixel circuit using the modulated data voltage.

DETAILED DESCRIPTION

The following detailed description is merely exemplary in nature and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Input-display devices, such as touchscreens, are widely used in a variety of electronic systems. Input-display devices may include a sensing region, often demarked by a surface. In the sensing region, the input-display device determines the presence, location, motion, and/or force of one or more input objects. As used herein, touch sensing includes proximity (e.g., no contact), touch (e.g., contact on an input surface), and contact with force. Touch sensing is implemented with touch sensors. The touch sensors are electrodes that are used in performing touch sensing. Examples of touch sensing includes mutual or transcapacitive sensing and absolute or self-capacitive sensing. In one or more embodiments, an input-display device includes a display screen. The display screen may be used to display content or information to a user, and the touch sensing may enable the user to interact with the displayed content. The touch sensing may involve driving the touch sensors with a sensing waveform, e.g. a square wave. The presence of the sensing waveform on the touch sensors may cause interference in the display screen. The interference may result in display artifacts, such as darker and/or lighter regions in the display screen, e.g., in a striped pattern. In one or more embodiments, the driving of the display screen is performed in a manner compensating for the interference, such that the artifacts are reduced or avoided.

Figure 1:
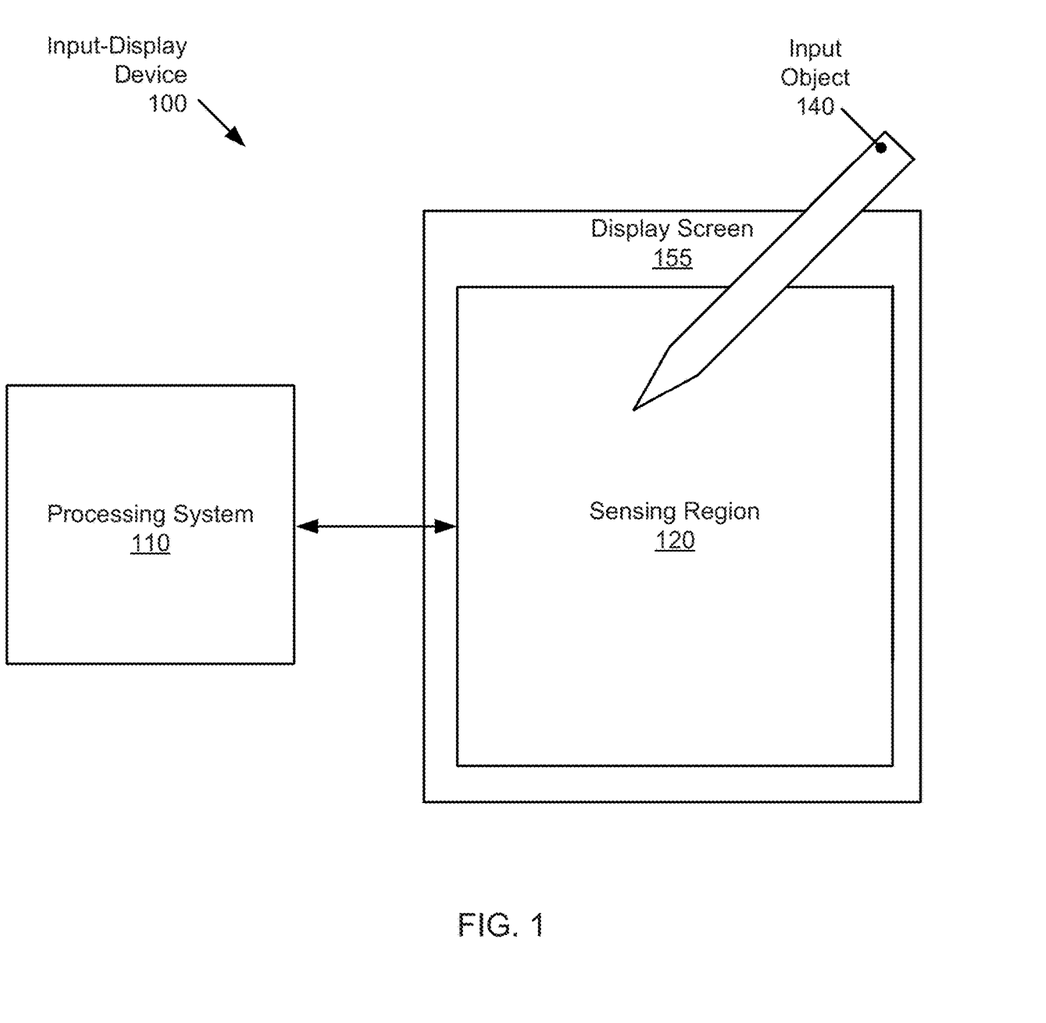
FIG. 1 shows an input device in accordance with one or more embodiments.

FIG. 1 is a block diagram of an example of an input-display device (100), in accordance with one or more embodiments. The input-display device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, smart phones, personal digital assistants (PDAs), automotive infotainment devices, gaming devices, etc.

In FIG. 1, the input-display device (100) includes a proximity and/or force sensor device (e.g., "touchpad" or a "touch sensor device") configured to sense input provided by one or more input objects (140) in a sensing region (120). Example input objects include styli, an active pen, and fingers.

The sensing region (120) encompasses any space above, around, in and/or near the input-display device (100) in which the input device (100) is able to detect user input (e.g., user input provided by one or more input objects). The sizes, shapes, and locations of particular sensing regions may vary widely from embodiment to embodiment.

The input-display device (100) may utilize any combination of sensor components and sensing technologies to detect user input in the sensing region (120). The input-display device (100) includes one or more sensing elements for detecting user input. As a non-limiting example, the input-display device (100) may use capacitive techniques.

In some capacitive implementations of the input-display device (100), voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitance measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter", TX) and one or more receiver sensor electrodes (also "receiver electrodes" or "receiver", RX). Transmitter sensor electrodes may be modulated relative to a reference voltage (e.g. system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers or may be configured to both transmit and receive. Measurements acquired using mutual capacitance sensing methods may be referred to as mutual capacitance measurements.

The absolute capacitance measurements and/or the mutual capacitance measurements may be used to determine when at least one input object is in a sensing region, determine signal to noise ratio, determine positional information of an input object, identify a gesture, determine an action to perform based on the gesture, a combination of gestures or other information, and/or perform other operations.

In FIG. 1, a processing system (110) is shown as part of the input-display device (100). The processing system (110) is configured to operate the hardware of the input-display device (100) to detect input in the sensing region (120). The processing system (110) includes parts of or all of one or more integrated circuits (ICs) and/or other circuitry components. For example, a processing system may include circuitry for mutual and/or absolute capacitance sensing. In some embodiments, the processing system (110) also includes electronically-readable instructions, such as firmware code, software code, and/or the like. In some embodiments, components composing the processing system (110) are located together, such as near sensing element(s) of the input-display device (100). In other embodiments, components of processing system (110) are physically separate with one or more components close to the sensing element(s) of the input-display device (100), and one or more components elsewhere. For example, the input-display device (100) may be a peripheral coupled to a computing device, and the processing system (110) may include software configured to run on a central processing unit of the computing device and one or more ICs (perhaps with associated firmware) separate from the central processing unit. As another example, the input-display device (100) may be physically integrated in a mobile device, and the processing system (110) may include circuits and firmware that are part of a main processor of the mobile device. In some embodiments, the processing system (110) is dedicated to implementing the input-display device (100). In other embodiments, the processing system (110) also performs other functions, such as driving haptic actuators, etc.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input-display device (100) is implemented with additional input components that are operated by the processing system (110) or by some other processing system. These additional input components may provide redundant functionality for input in the sensing region (120), or some other functionality.

In some embodiments, the input-display device (100) includes a touch screen interface, and the sensing region (120) overlaps at least part of an active area of a display screen (155). For example, the input-display device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), microLED, liquid crystal display (LCD), or other display technology. The proximity and/or force sensor device and the display screen of the input-display device (100) may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While FIG. 1 shows a configuration of components, other configurations may be used without departing from the scope of the invention. For example, various components may be combined to create a single component. As another example, the functionality performed by a single component may be performed by two or more components.

Figure 2A:
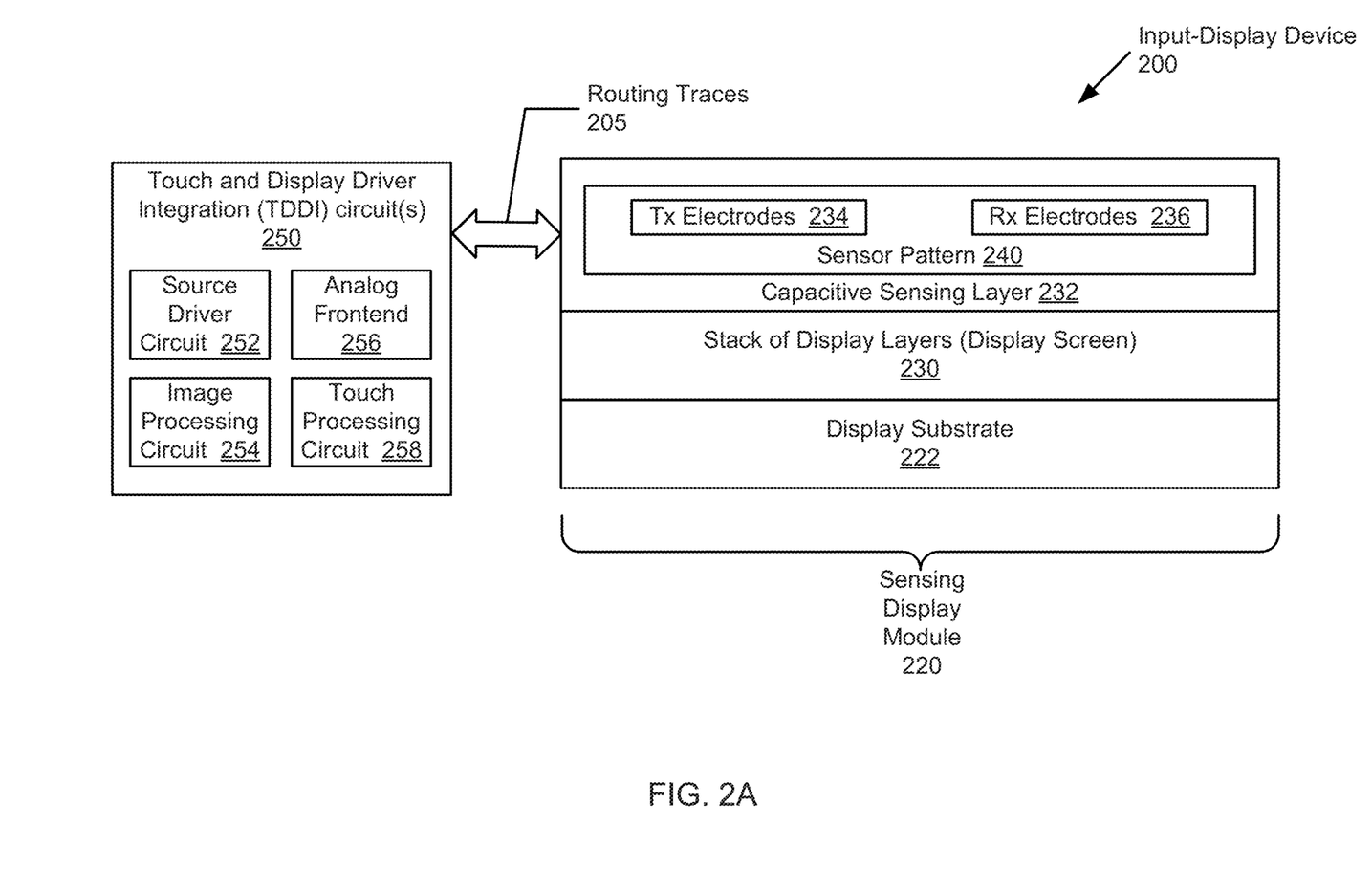
FIG. 2A shows an input device in accordance with one or more embodiments.

FIG. 2A shows an input-display device (200) in accordance with one or more embodiments. As shown in FIG. 2A, the input-display device (200) includes a sensing-display module (220) and a touch and display driver integration (TDDI) circuit (250) coupled to the sensing-display module via routing traces (205). The sensing-display module (220) may implement all or a part of the sensing region (120) and all or a part of the display screen (155), discussed above in reference to FIG. 1.

In one or more embodiments, the sensing-display module (220) includes multiple layers including a stack of display layers (230), one or more capacitive sensing layers (232), and a display substrate (222). The display layers (230) form a display screen. In one embodiment, the display screen is an OLED display. Accordingly, the stack of display layers (230) may include OLED display layers such as an organic emissive layer, an anode layer, a cathode layer, one or more conductive layers which may include a thin-film transistor (TFT) layer, etc. The stack of display layers (230) may be disposed on the display substrate (222). In one embodiment, the display substrate (222) is a flexible plastic substrate, to enable a flexible, rollable and/or foldable OLED display.

The stack of display layers (230) may include microLED layers such as a layer of LEDs disposed on a thin-film transistor (TFT) layer on the display substrate (222).

The stack of display layers (230) may include LCD display layers such as a color filter glass layer, a liquid crystal layer, and a TFT layer disposed on the display substrate (222), which may be glass.

The sensing-display module (220) may have additional layers and components. In one or more embodiments, multiple transmitter (TX) (234) and/or receiver (RX) (236) electrodes are disposed in the one or more capacitive sensing layers (232) in a sensing region of the display screen. The sensing region may span all or part of the display screen. The TX (234) and/or RX (236) electrodes may be used in capacitance sensing (e.g., absolute capacitance sensing, mutual capacitance sensing, etc.), as described above in reference to FIG. 1.

While FIG. 2A shows the capacitive sensing layer(s) (232) as being disposed on top of the stack of display layers (230), these layers may be located anywhere, relative to the stack of display layers (230). For example, one layer with RX electrodes (236) may be located on top of the stack of display layers (230), and another layer with TX electrodes (234) may be located in or below the stack of display layers (230). Alternatively, there may be no layer with TX electrodes. In one or more embodiments, the sensing module (220) includes a matrix pad sensor with numerous sensing pads and traces connecting to the sensing pads in a metal mesh layer across the sensing region. The matrix pad sensor may include at least one such metal mesh layer. Instead of using a dedicated metal mesh layer, a display layer, e.g., an OLED display cathode layer may be patterned to serve as a metal mesh layer.

In one or more embodiments, the TX electrodes (234) and the RX electrodes (236), together, implement mutual capacitance sensing. In other words, a waveform is driven onto the TX electrodes (234) and a resulting signal(s) is received from the RX electrodes (236). The resulting signal is a function of the waveform and change in capacitance between the TX electrodes and RX electrodes (234, 236) due to the presence of an input object.

In one or more embodiments, the RX electrodes (236) are operated to perform absolute capacitance sensing independent of the TX electrodes (234). In one or more embodiments, the transmitter electrodes (234) are operated to perform absolute capacitance sensing independent of the receiver electrodes (236).

In one or more embodiments, the stack of display layers (230) includes one or more layers, e.g., a thin-film transistor (TFT) layer, with source lines and gate lines and transistors for controlling the individual OLED, LCD or microLED units of the display pixels (or pixels) of the display screen. In one or more embodiments, one or more source lines and/or one or more gate lines are also operated to perform absolute capacitance sensing.

In one or more embodiments, a touch and display driver integration (TDDI) circuit (250) includes a source driver circuit (252) that drives the transistors controlling the pixels of the display screen. Each of the pixels may include an OLED pixel, a microLED pixel, a microOLED pixel, an LCD pixel, etc. The TDDI circuit (250) may receive an image signal from a host application processor (e.g. a video processor), or any other component (not shown) that provides image content to be displayed on the display screen (155). The received image signal may be in digital form. An image processing circuit (254) may process the received image signal to output a processed image signal. For example, the image processing circuit (254) may perform a mura correction and/or other image processing operations. The processed image signal may be provided to the source driver circuit (252) where an analog signal is generated to drive the transistors associated with the pixels of the display screen, in accordance with one or more embodiments. The image processing circuit (254) may be integrated in the TDDI circuit (250), or the image processing circuit (254) may be located elsewhere. Any kind of additional circuits related to the displaying of images may be included in the TDDI circuit (250), without departing from the disclosure.

In one or more embodiments, the TDDI circuit (250) is further configured to perform capacitance sensing. The TDDI circuit (250) may drive capacitive sensing electrodes (e.g., the TX electrodes (234) or a subset of the TX electrodes (234)), and may receive resulting signals from capacitive sensing electrodes (e.g., from the RX electrodes (236) or a subset of the RX electrodes (236)), to determine the presence and/or position of an input object (e.g., input object (140), discussed above in reference to FIG. 1). The TDDI circuit (250) may include various components. In one embodiment, the TDDI circuit (250) includes an analog frontend (256) configured to perform the capacitance sensing by driving the capacitive sensing electrodes, receiving the resulting signals, and analog-to-digital converting the resulting signals. The digital processing may be performed elsewhere, by a touch processing circuit (258), e.g., a microprocessor, digital signal processor, etc. In one embodiment, the TDDI circuit (228) includes some or all elements of the touch processing circuit (258). Alternatively, the touch processing circuit (258) may be located elsewhere.

In one or more embodiments, the TDDI circuit (250) is housed in a single semiconductor package, e.g., an application-specific integrated circuit (ASIC). The source driver circuit (252), the image processing circuit (254), the analog frontend (256), and/or the touch processing circuit (258) may be on separate dies or on a single die, in the semiconductor package. The semiconductor package may be disposed on the display substrate (222) or elsewhere. Further, embodiments of the disclosure may include multiple TDDI circuits, each associated with a different region on the display of the sensing-display module (220).

Figure 2B:
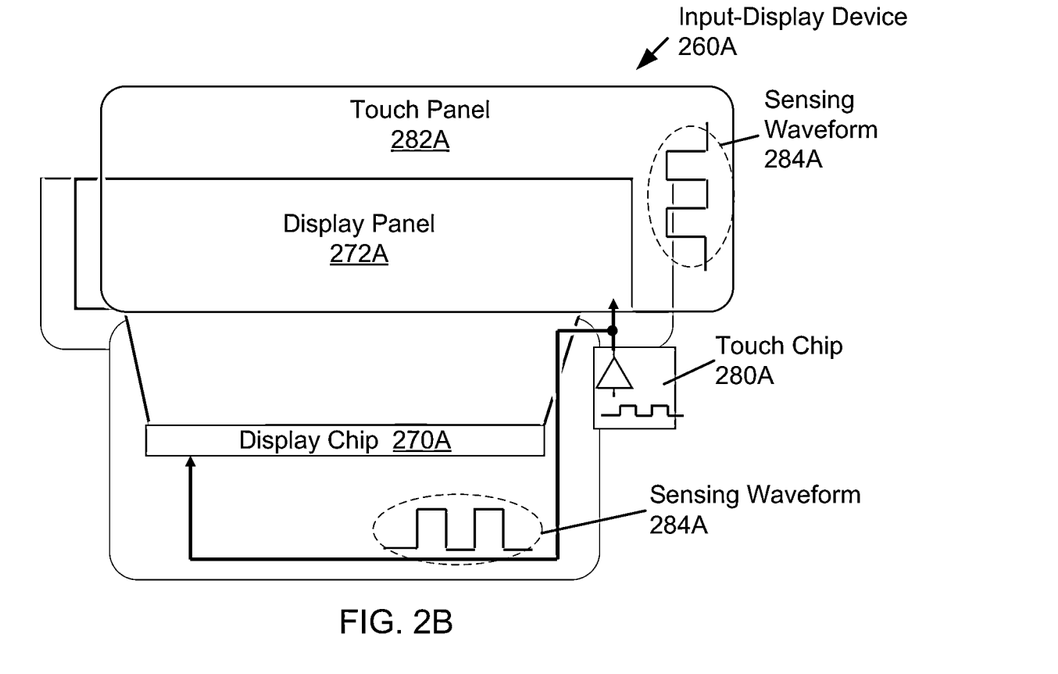
FIG. 2B shows an input device in accordance with one or more embodiments.
Figure 2C:
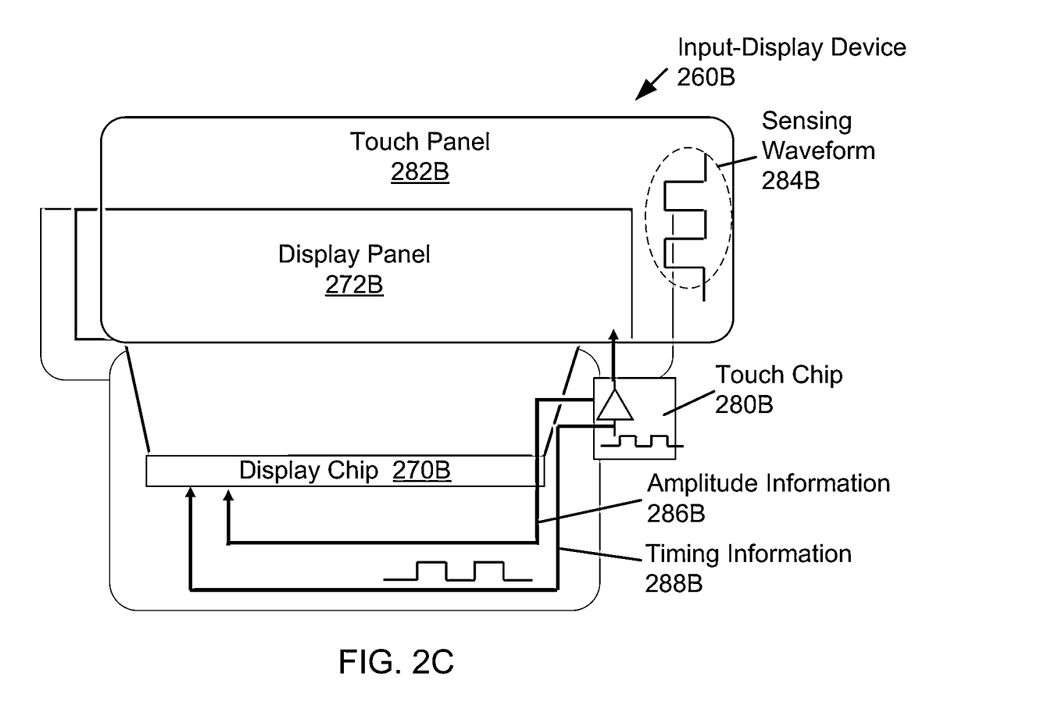
FIG. 2C shows an input device in accordance with one or more embodiments.

FIG. 2B and FIG. 2C each show an input-display device (260A, 260B) in accordance with one or more embodiments. The input-display device (260A, 260B) includes a display panel (272A, 272B) driven by a display chip (270A, 270B), and a touch panel (282A, 282B), driven by a touch chip (280A, 280B). The display chip (270A, 270B) may include components such as a source drive circuit and an image processing circuit, as previously described. The touch chip (280A, 280B) may include components such as an analog frontend and a touch processing circuit, as previously described. Unlike in the embodiment described in reference to FIG. 2A, the display chip (270A, 270B) and the touch chip (280A, 280B) are not integrated in a TDDI circuit. The touch chip (280A, 280B) provides a sensing waveform (284A, 284B) for touch sensing. In one or more embodiments, data about the sensing waveform (284A, 284B) is shared with the display chip (270A, 270B). In the input-display device (260A), the sensing waveform (284A) itself is provided to the display chip (270A). Accordingly, the display chip (270A) is made aware of the timing, polarity, and amplitude of the sensing waveform (284A) by receiving the sensing waveform (284A). In the input-display device (260B), amplitude information (286B) and timing information (288B) are separately provided. The timing (and polarity) information may be provided by a pulse train provided using general purpose input/output (GPIO) pins. The amplitude information may be provided using a separate digital interface.

Figure 3A:
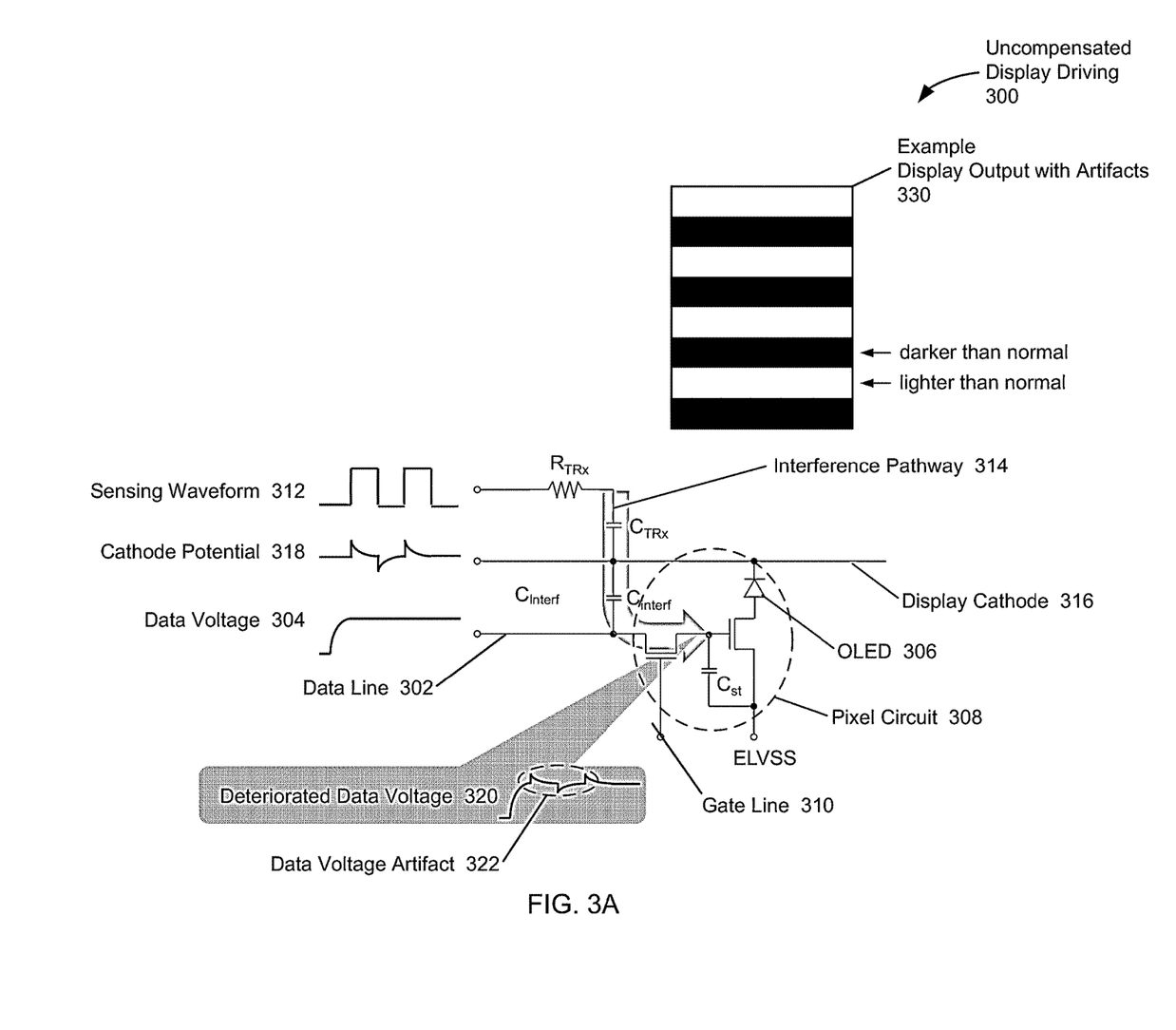
FIG. 3A shows an uncompensated display driving.

Turning to FIG. 3A, an uncompensated display driving (300) is shown. A data line (302) carries a data voltage (304) for driving a pixel, e.g., a single OLED (306). The data voltage (304) may be a square wave signal originating from the source driver circuit of the TDDI circuit, described in reference to FIG. 2A. Due to resistances and capacitances that are associated with the routing trace carrying the data voltage (304) to the pixel circuit (308), the data voltage (304) includes an onset transient. Upon activation of the gate line (310) of the pixel circuit (308), the data voltage (304) on the data line (302) charges a capacitor, CSI, to allow a current through the OLED (306), based on the data voltage (304). Accordingly, the output of the OLED (306) may be governed by the data voltage (304), with a higher data voltage generally resulting in an increased light output. The driving of an OLED, while illustrated for a single OLED, may be performed for all OLEDs of a display screen. Variations of the pixel circuits may be used, without departing from the disclosure. Further, other previously mentioned display technologies may be used, without departing from the disclosure.

In one or more embodiments, a touch sensing occurs, at least in part, simultaneously with the driving of the display. As a result, the sensing waveform (312) may capacitively couple onto the data voltage (304) at the pixel circuit (308), via an interference pathway (314) (gray arrow). Specifically, as illustrated, the sensing waveform (312) modulates the cathode potential (318), resulting in the cathode potential waveform shown in FIG. 3A, based on the RC time constant associated with, for example, $R_{TRx}$ and $C_{TRx}$. An interference capacitance, $C_{interf}$, between the cathode layer of the display (display cathode (316)) and the data line (302) may further couple the sensing waveform (312) onto the data voltage (304), thereby resulting in the deteriorated data voltage (320). The deteriorated data voltage (320), thus, includes an artifact on the data voltage (322) (e.g., a voltage fluctuation as illustrated in FIG. 3A), caused by the sensing waveform (312). The artifact (322) of the deteriorated data voltage (320) may cause a fluctuation in the output of the OLED (306).

In FIG. 3A, the example display output with artifacts (330) illustrates possible artifacts in the display output. In the example, the artifacts include a non-homogeneous display output with rows of pixels that are lighter than normal and rows of pixels that are darker than normal. Some rows of pixels are lighter, and some rows of pixels are darker, based on the capacitors, $C_{st}$ of the OLEDs in the darker and lighter regions in the display output being charged to different voltages, as a result of the artifact (322) on the deteriorated data voltage (320). While the described effect may occur in any type of sensing display module, the effect may be particularly noticeable, and thus undesirable, in OLED-based sensing display modules (e.g., flexible, rollable and/or foldable OLED sensing display) modules where the layers (as shown in FIG. 2A) are highly integrated with minimal spacing, thus resulting in increased capacitive couplings (e.g., $C_{interf}$) between conductive elements. Further, the described effect may be particularly prominent when an absolute capacitive sensing is employed, because all capacitive sensing electrodes involved in the absolute capacitive touch sensing may be modulated with the same phase. However, the effect may also be noticeable in transcapacitive sensing configurations, where only some of the capacitive sensing electrodes may be modulated or where an opposite phase modulation may be used to reduce the effect. Similarly, the effect may also be noticeable in hybrid sensing configurations which combine an absolute capacitive sensing and a transcapacitive sensing.

Figure 3B:
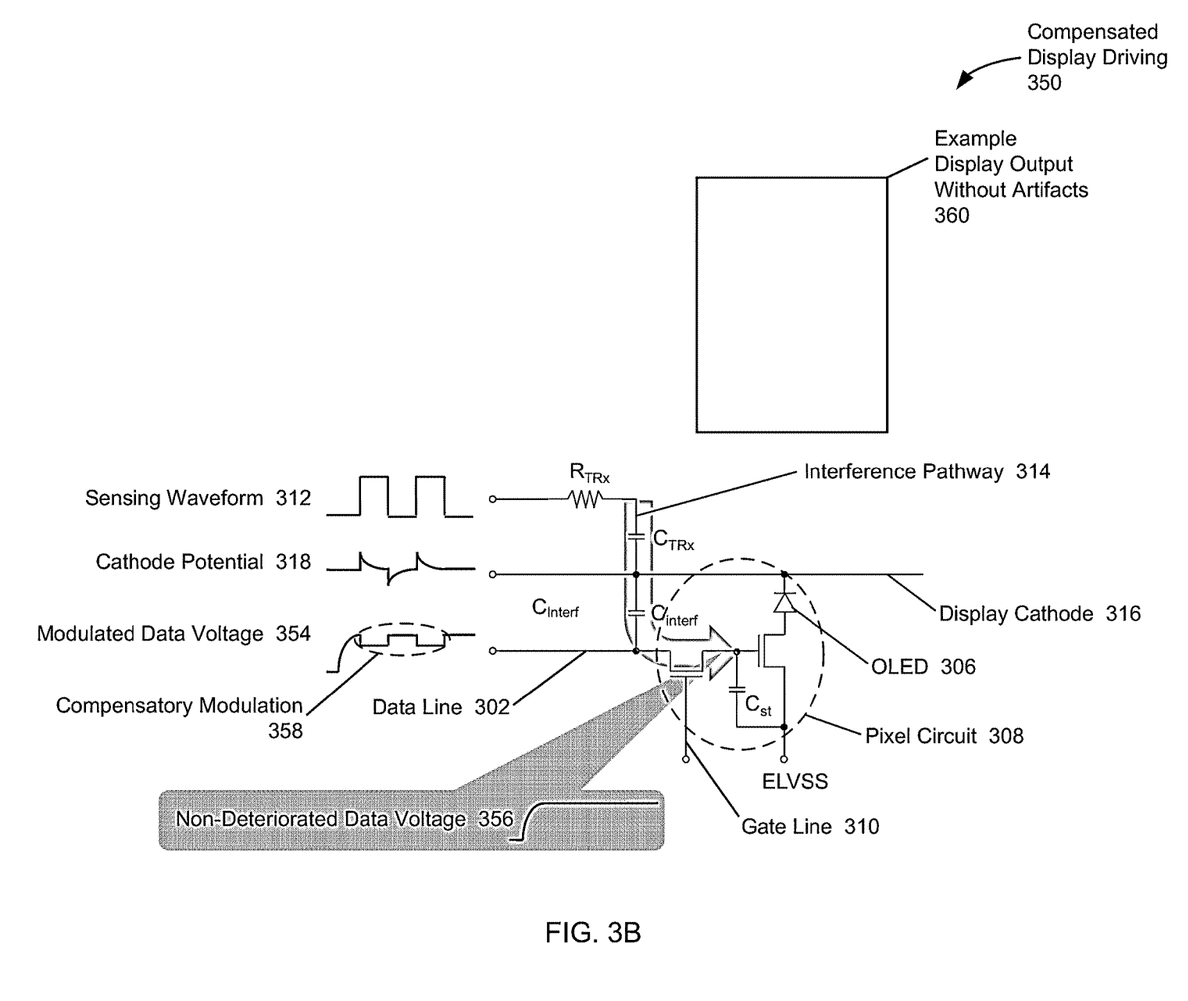
FIG. 3B shows a compensated display driving in accordance with one or more embodiments.

Turning to FIG. 3B, a compensated display driving (350), in accordance with one or more embodiments, is shown. Various elements shown in FIG. 3B are substantially similar or identical to the corresponding elements shown in FIG. 3A. In one or more embodiments, the data voltage emitted by the source driver circuit is a modulated data voltage (354). The modulated data voltage (354) may include a compensatory modulation (358). The compensatory modulation (358) may be selected to eliminate or at least reduce the deterioration in the deteriorated data voltage (320), shown in FIG. 3A. With the compensatory modulation (358) on the modulated data voltage (354), a non-deteriorated data voltage (356) rather than a deteriorated data voltage (356) may be present at the pixel circuit (308).

The modulated data voltage (354) may be based on the data voltage (304), with a compensatory modulation (358) superimposed. In one or more embodiments, the compensatory modulation (358) is selected to eliminate or at least reduce the artifact (322) of the deteriorate data voltage (320) in FIG. 3A. To reduce or eliminate the artifact (322), the source driver circuit may superimpose the compensatory modulation (358) on the data voltage to obtain the modulated data voltage (354). The characteristics of the compensatory modulation (358) include timing and amplitude of the compensatory modulation (358). The characteristics of the compensatory modulation (358) may be selected such that the characteristics effectively cancel the effect of the sensing waveform (312) on the data voltage via the interference pathway (314).

FIG. 3B illustrates a complete cancelation, where the non-deteriorated data voltage (356) has no artifact. In a partial cancelation, a reduced artifact (in comparison to the artifact (322) of FIG. 3A) may remain. The timing for the compensatory modulation (358) may be available from the analog frontend emitting the sensing waveform. The timing may, thus be provided to the source drive circuit, by the analog frontend. In other configurations where source driver circuit and analog frontend are not integrated in a TDDI circuit, the timing for the source driver circuit may be externally provided to the source driver circuit for synchronization. The amplitude of the compensatory modulation (358) may be obtained through empirical measurement and optimization and/or through circuit modeling of the input-display device, including the capacitances and resistances of the input-display device. The amplitude of the artifact (322) may not be fixed, and may depend on, for example, the amplitude of the touch sensing waveform (312). Accordingly, different amplitudes of the compensatory modulation (358) may be used, depending on the amplitude of the touch sensing waveform (312). In this scenario, the amplitude of the touch sensing waveform (312) may be obtained from the analog frontend (256). In configurations, where the analog frontend (256) and the source driver circuit (252) are integrated in a TDDI circuit (250) (e.g., FIG. 2A), the source driver circuit (252) may directly obtain the amplitude of the touch sensing waveform from the analog frontend (256). In configurations, where the analog frontend (256) and the source driver circuit (252) are not integrated (e.g., FIGS. 2B and 2C), the amplitude of the touch sensing waveform may be communicated, for example, using general purpose input/output pins.

In one embodiment, the source driver circuit applies the compensatory modulation (358) to the data voltage using a modified gamma transformation. The gamma transformation may convert gray levels specified by the input image data for respective pixel circuits into voltage values that specify output voltage levels with which the pixel circuits are updated (i.e., the data voltage). The modified gamma transformation further adds the compensatory modulation (358) as an amplitude increment (positive and/or negative) to the data voltage outputted to the pixel circuit (308), using the timing.

Figure 4:
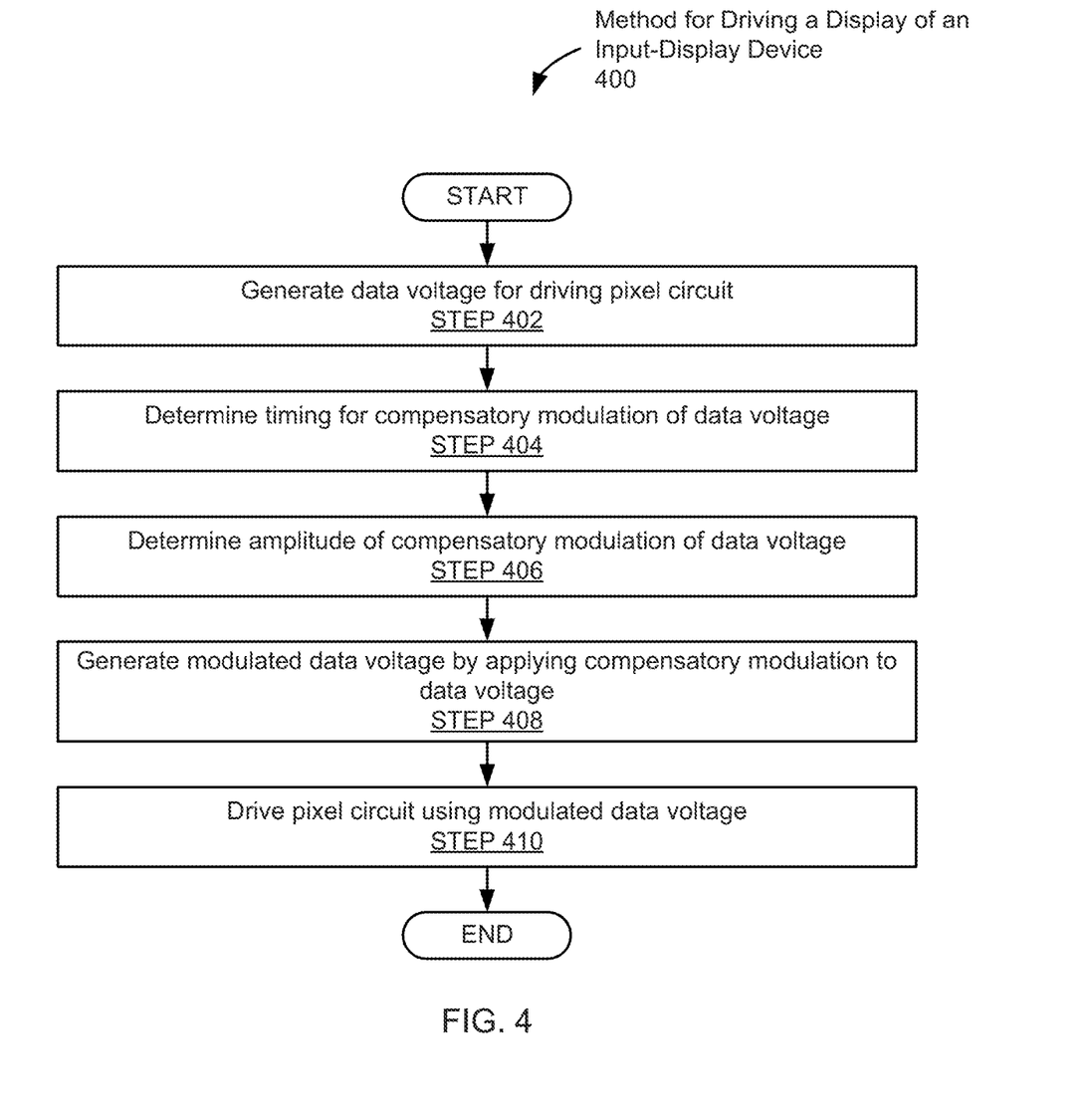
FIG. 4 shows a flowchart in accordance with one or more embodiments.

FIG. 4 show a flowchart in accordance with one or more embodiments. While the various steps in this flowchart are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 4.

The flowchart of FIG. 4 depicts a method for driving a display of an input-display device, in accordance with one or more embodiments. While the following description cover the driving of a single pixel circuit associated with a single display pixel, the same steps may be performed to drive additional pixel circuits of an input-display device.

In Step 402, a data voltage is generated for driving the pixel circuit. The data voltage may be generated based on an image signal. For example, an image signal may be received by an image processing circuit. The image signal may be received from a host application processor. The image processing circuit may perform various operations as previous described, to generate a processed image signal. The source driver circuit may operate on the processed image signal to generate the data voltage, as previously described.

In Step 404, a timing for a compensatory modulation of the data voltage is determined. The timing may be obtained from the analog frontend that emits the sensing waveform associated with the capacitive sensing. For example, the analog frontend may use a control signal for triggering an emission of the sensing waveform, and the control signal may be obtained by the source driver circuit to identify the onset of the emission of the sensing waveform.

In Step 406, an amplitude for the compensatory modulation of the data voltage is determined. The amplitude may be described by variables or constants stored in a memory. The amplitude for the compensatory modulation may have been empirically obtained. Alternatively, the amplitude for the compensatory modulation may have been obtained through modeling and/or simulation.

In Step 408, a modulated data voltage is generated by applying the compensatory modulation to the data voltage.

The compensatory modulation may be additively applied to the data voltage. In one embodiment, the source driver performs a gamma transformation to obtain the data voltage from a gray level specified by image data. The compensatory modulation may be performed as part of the gamma transformation.

In Step 410, the pixel circuit is driven using the modulated data voltage. Driving the pixel circuit may involve charging a storage capacitor to the modulated data voltage. The modulated data voltage in the storage capacitor may specific the level of light emission by the pixel.

Embodiments of the disclosure enable suppression or reduction of display artifacts without altering the voltage or frequency of the sensing waveform. Embodiments of the disclosure thus allow the touch sensing parameters for the sensing waveform to be determined based on other considerations (such as the sensing frequency being determined based on touch sensor RC bandwidth, avoiding frequencies for display noise, and noisy chargers), thereby making the input-display device easier to configure and more robust.

Embodiments of the disclosure may be suitable for implementation using a TDDI architecture, combining the source driver circuit associated with the displaying of images and the analog frontend associated with the touch sensing. Embodiments of the disclosure may also be used where the source driver circuit is separate from the analog frontend.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

What is claimed is:

1. An input-display device, comprising:
    a display screen disposed on a display substrate, the display screen comprising a plurality of display pixels;
    a plurality of capacitive sensing electrodes for capacitive sensing in a sensing region of the display screen; and
    a source driver circuit configured to:
        generate a data voltage for driving a pixel circuit associated with one display pixel of the plurality of display pixels;
        determine a timing for a compensatory modulation of the data voltage,
            wherein the timing is determined using a sensing waveform of the capacitive sensing;
        determine an amplitude of the compensatory modulation, wherein the amplitude of the compensatory modulation is based at least in part on measured capacitances in the input display device and the sensing waveform, wherein different amplitudes of the compensatory modulation are used depending on the sensing waveform;
        generate a modulated data voltage by applying the compensatory modulation to the data voltage; and
        drive the pixel circuit using the modulated data voltage.

2. The input-display device of claim 1, further comprising:
    a touch and display driver integration (TDDI) circuit comprising:
        the source driver circuit, wherein the source driver circuit is configured to generate the data voltage based on a processed image signal, and
        an analog frontend for the capacitive sensing, the analog frontend interfacing with the plurality of capacitive sensing electrodes to obtain a plurality of touch signals, wherein the analog frontend generates the sensing waveform.

3. The input-display device of claim 2, wherein the TDDI circuit further comprises:
    an image processing circuit configured to generate the processed image signal based on a received image signal obtained from a host application processor, and
    a touch processing circuit configured to generate a touch output signal by processing the plurality of touch signals.

4. The input-display device of claim 2, wherein determining the timing for the compensatory modulation comprises:
    obtaining, the timing from the analog frontend.

5. The input-display device of claim 1, wherein the amplitude of the compensatory modulation is selected to, at least partially, compensate for an artifact on the data voltage at the pixel circuit, the artifact associated with the sensing waveform coupled onto the data voltage via a parasitic capacitance.

6. The input-display device of claim 1,
    wherein applying the compensatory modulation to the data voltage comprises:
        additively superimposing the compensatory modulation on the data voltage.

7. The input-display device of claim 1,
    wherein the source driver is further configured to perform a gamma transformation to obtain the data voltage from a gray level specified by input image data, and
    wherein performing the gamma transformation comprises applying the compensatory modulation as an amplitude increment to the data voltage.

8. The input-display device of claim 1, wherein the display screen is an OLED display screen.

9. The input-display device of claim 1,
    wherein the display screen comprises a display cathode, and
    wherein the display cathode is one of the plurality of capacitive sensing electrodes.

10. A touch and display driver integration (TDDI) circuit, the TDDI circuit comprising:
    a source driver circuit configured to:
        generate a data voltage for driving a pixel circuit associated with a pixel of a display screen, based on a processed image signal;
        determine a timing for a compensatory modulation of the data voltage,
            wherein the timing is determined using a sensing waveform of a capacitive sensing;
        determine an amplitude of the compensatory modulation, wherein the amplitude of the compensatory modulation is based at least in part on measured capacitances in the input display device and the sensing waveform, wherein different amplitudes of the compensatory modulation are used depending on the sensing waveform;
        generate a modulated data voltage by applying the compensatory modulation to the data voltage; and
        drive the pixel circuit using the modulated data voltage.

11. The TDDI circuit of claim 10, further comprising:
    an analog frontend for the capacitive sensing, the analog frontend interfacing with a plurality of capacitive sensing electrodes to obtain a plurality of touch signals, wherein the analog frontend generates the sensing waveform.

12. The TDDI circuit of claim 11, further comprising:
an image processing circuit configured to generate the processed image signal based on a received image signal obtained from a host application processor;
a touch processing circuit configured to generate a touch output signal by processing the plurality of touch signals.

13. The TDDI circuit of claim 11, wherein determining the timing for the compensatory modulation comprises:
obtaining, the timing from the analog frontend.

14. The TDDI circuit of claim 10, wherein the amplitude of the compensatory modulation is selected to, at least partially, compensate for an artifact on the data voltage at the pixel circuit, the artifact associated with the sensing waveform coupled onto the data voltage via a parasitic capacitance.

15. The TDDI circuit of claim 10,
wherein applying the compensatory modulation to the data voltage comprises:
additively superimposing the compensatory modulation on the data voltage.

16. The TDDI circuit of claim 10,
wherein the source driver is further configured to perform a gamma transformation to obtain the data voltage from a gray level specified by input image data, and
wherein performing the gamma transformation comprises applying the compensatory modulation as an amplitude increment to the data voltage.

17. A method for driving a display of an input-display device, the method comprising:
generating a data voltage for driving a pixel circuit of the display;
determining a timing for a compensatory modulation of the data voltage,
wherein the timing is determined using a sensing waveform of a capacitive sensing;
determining an amplitude of the compensatory modulation, wherein the amplitude of the compensatory modulation is based at least in part on measured capacitances and the sensing waveform, wherein different amplitudes of the compensatory modulation are used depending on the amplitude of the sensing waveform;
generating a modulated data voltage by applying the compensatory modulation to the data voltage; and
driving the pixel circuit using the modulated data voltage.

18. The method of claim 17, wherein determining the timing for the compensatory modulation comprises:
obtaining, the timing from an analog frontend for proximity sensing, the analog frontend configured to generate the sensing waveform.

19. The method of claim 17, wherein applying the compensatory modulation to the data voltage comprises:
additively superimposing the compensatory modulation on the data voltage.

20. The method if claim 17, further comprising:
performing a gamma transformation to obtain the data voltage from a gray level specified by input image data, and
wherein performing the gamma transformation comprises applying the compensatory modulation as an increment to the data voltage.

* * * * *